(12) United States Patent
Nissato (10) Patent No.: US 8,930,098 B2
(45) Date of Patent: Jan. 6, 2015

(54) CLUTCH CONTROL DEVICE OF HYBRID VEHICLE

(75) Inventor: Yukihiro Nissato, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 629 days.

(21) Appl. No.: 13/267,927

(22) Filed: Oct. 7, 2011

(65) Prior Publication Data

US 2012/0089284 A1    Apr. 12, 2012

(30) Foreign Application Priority Data

Oct. 8, 2010    (JP) ................................ 2010-228056

(51) Int. Cl.
G06F 7/00       (2006.01)
G06F 17/00      (2006.01)
G06F 19/00      (2011.01)

(52) U.S. Cl.
USPC ............ 701/54; 701/22; 701/67; 180/65.285; 180/65.235; 477/181

(58) Field of Classification Search
USPC ............ 701/22, 54, 67; 477/5, 181; 903/918, 903/946, 903; 180/65.23, 65.27, 65.285, 180/65.29, 65.235
See application file for complete search history.

(56) References Cited

U.S. PATENT DOCUMENTS

| | | | |
|---|---|---|---|
| 6,278,915 B1* | 8/2001 | Deguchi et al. | 701/22 |
| 6,563,230 B2* | 5/2003 | Nada | 290/40 C |
| 6,757,598 B2* | 6/2004 | Okoshi | 701/22 |
| 6,784,563 B2* | 8/2004 | Nada | 290/40 C |
| 7,117,071 B2* | 10/2006 | Aoki et al. | 701/22 |
| 7,395,893 B2* | 7/2008 | Porter | 180/243 |
| 8,204,659 B2* | 6/2012 | Kouno et al. | 701/55 |
| 8,761,980 B2* | 6/2014 | Kimoto | 701/22 |

(Continued)

FOREIGN PATENT DOCUMENTS

CN    101133514 A    2/2008
JP    2000-71815 A    3/2000

(Continued)

OTHER PUBLICATIONS

A Gatekeeper energy management strategy for ECVT hybrid vehicle propulsion utilising ultracapacitors; Auer, J. ; Sartorelli, G. ; Miller, John; Hybrid Vehicle Conference, IET The Institution of Engineering and Technology, 2006; Publication Year: 2006 , pp. 79-90.*

(Continued)

*Primary Examiner* — Cuong H Nguyen
(74) *Attorney, Agent, or Firm* — Birch, Stewart, Kolasch & Birch, LLP (57) ABSTRACT

A clutch control device of a hybrid vehicle includes a battery, a generator, a motor, a motor shaft connected with a driving shaft of the vehicle by using electricity from the generator or the battery, an engine which drives the generator and the vehicle, a clutch, and a control unit. The control unit changes an engaged state of the clutch between the motor shaft and an engine shaft of the engine to a released state and changes an engine driving state of the hybrid vehicle, in which the hybrid vehicle is driven by the engine, to a motor driving state of the hybrid vehicle in which the hybrid vehicle is driven by the motor, when a vehicle velocity of the hybrid vehicle is the change vehicle velocity.

5 Claims, 8 Drawing Sheets

(56) References Cited

U.S. PATENT DOCUMENTS

| | | | |
|---|---|---|---|
| 2001/0048226 A1* | 12/2001 | Nada | 290/40 C |
| 2002/0107618 A1* | 8/2002 | Deguchi et al. | 701/22 |
| 2003/0033060 A1* | 2/2003 | Okoshi | 701/22 |
| 2003/0034187 A1* | 2/2003 | Hisada et al. | 180/65.1 |
| 2003/0102673 A1* | 6/2003 | Nada | 290/40 C |
| 2004/0045751 A1* | 3/2004 | Aoki et al. | 180/65.2 |
| 2006/0206276 A1 | 9/2006 | Kim et al. | |
| 2007/0028718 A1* | 2/2007 | Lee et al. | 74/661 |
| 2008/0006467 A1 | 1/2008 | Morishita et al. | |
| 2012/0072065 A1* | 3/2012 | Minamikawa et al. | 701/22 |
| 2012/0095632 A1* | 4/2012 | Kimoto | 701/22 |

FOREIGN PATENT DOCUMENTS

| | | | |
|---|---|---|---|
| JP | 2000-110709 | * | 4/2000 |
| JP | 2001-298805 A | | 10/2001 |
| JP | 3702897 B2 | | 10/2005 |
| JP | 2006-246562 A | | 9/2006 |
| JP | 2008-12988 A | | 1/2008 |
| JP | 2008-289262 | * | 11/2008 |
| JP | 2010-76680 A | | 4/2010 |
| WO | WO 00/15455 A2 | | 3/2000 |

OTHER PUBLICATIONS

Design and Simulation of Fuzzy Control Strategy for Parallel Hybrid Electric Vehicle; Bin Xu ; Ming Li ; Shichun Yang ; Bin Guo ; Haigang Cui; Intelligent System Design and Engineering Application (ISDEA), 2010 International Conference on vol. 1; DOI: 10.1109/ISDEA.2010.287; Publication Year: 2010 , pp. 539-543.*

The energy management control strategy for electric vehicle applications; Wangsupphaphol, A. ; Idris, N.R.N. ; Jusoh, A. ; Muhamad, N.D. ; Yao, L.W.; Green Energy for Sustainable Development (ICUE), 2014 International Conference and Utility Exhibition on; Publication Year: 2014 , pp. 1-5.*

Modeling and simulation of a dual clutch hybrid vehicle powertrain; Joshi, A.S. ; Shah, N.P. ; Mi, C.; Vehicle Power and Propulsion Conference, 2009. VPPC '09. IEEE; DOI: 10.1109/VPPC.2009.5289682; Publication Year: 2009 , pp. 1666-1673.*

Dual-Mode Power-Split Transmission for Hybrid Electric Vehicles; Mashadi, B. ; Emadi, S.A.M.;Vehicular Technology, IEEE Transactions on; vol. 59 , Issue: 7; DOI: 10.1109/TVT.2010.2049870; Publication Year: 2010 , pp. 3223-3232.*

Ultracapacitor Enabled Gatekeeper Energy Management Strategy for Single Mode eCVT Hybrid Vehicle Propulsion; Miller, J.M. ; Everett, Michael ; Auer, Juergen; Vehicle Power and Propulsion Conference, 2006. VPPC '06. IEEE; DOI: 10.1109/VPPC.2006.364383; Publication Year: 2006 , pp. 1-6.*

European Office Action issued Mar. 27, 2014 for European Application No. 11 184 374.4.

Extended European Search report isued on Jan. 4. 2012.

Japanese Office Action for Application No. 2010-288056 mailed Oct. 17, 2012 with English Translation.

Russian Office Action for Application No. 2011140828 dated Dec. 18, 2012 with English Translation.

Office Action issued Jun. 19, 2014 in corresponding Chinese Application No. 201110296685.5 with English Translation.

* cited by examiner

CLUTCH CONTROL DEVICE OF HYBRID VEHICLE

BACKGROUND OF THE INVENTION

The present invention relates to a clutch control device of a hybrid vehicle.

Figure 8:
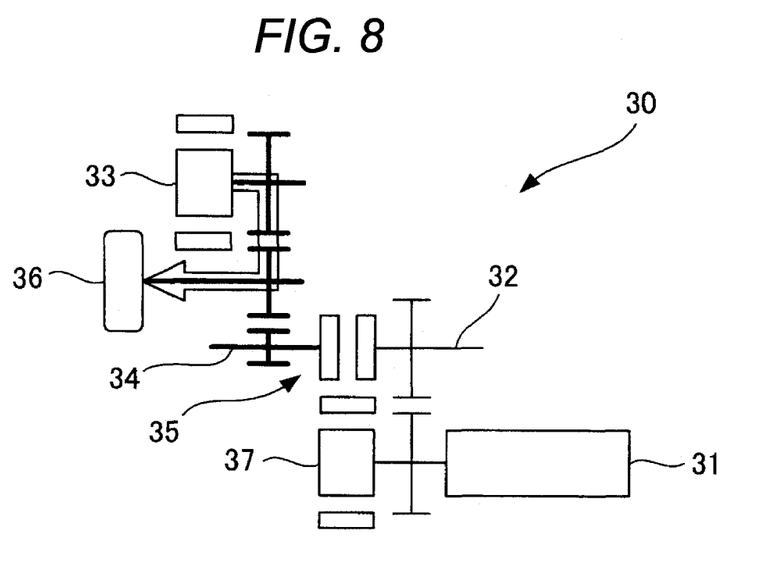
FIG. 8 is a schematic diagram illustrating an EV driving mode in a hybrid vehicle.
Figure 9:
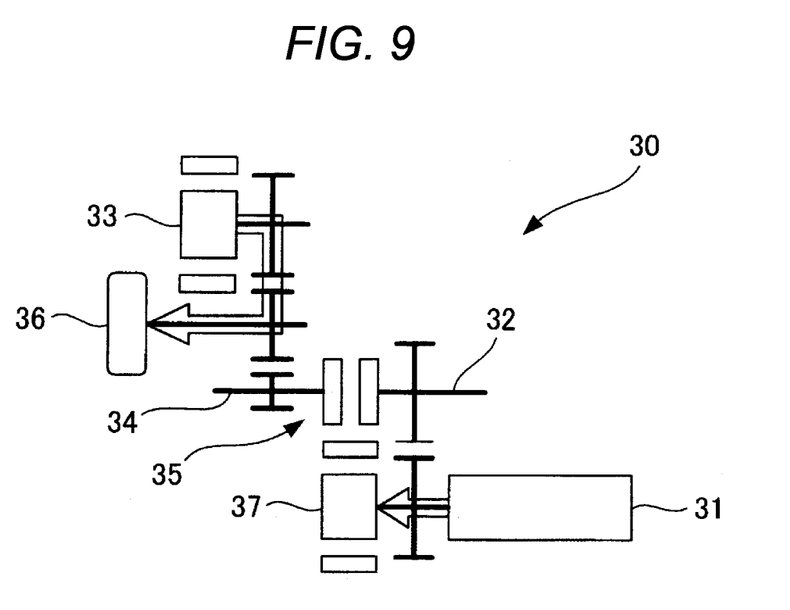
FIG. 9 is a schematic diagram illustrating a series driving mode in the hybrid vehicle.
Figure 10:
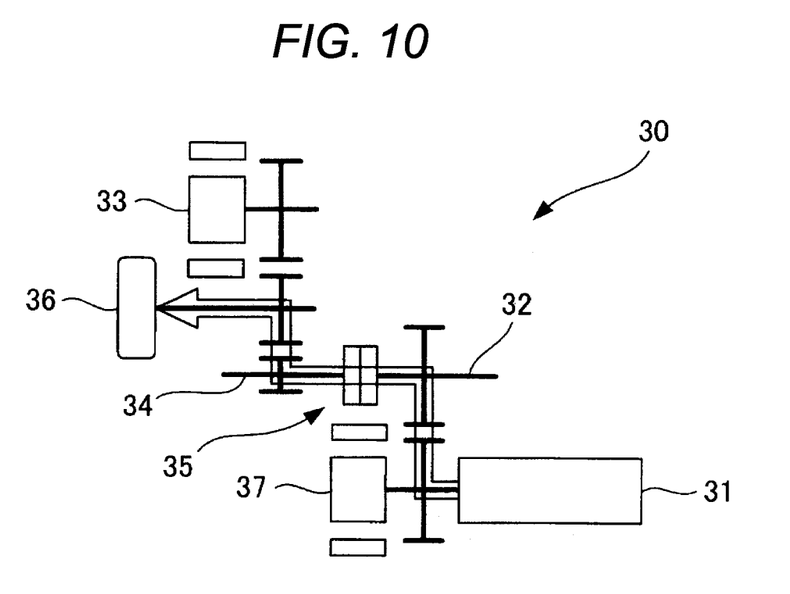
FIG. 10 is a schematic diagram illustrating a parallel driving mode in the hybrid vehicle.

A hybrid vehicle equipped with an engine and a motor has various driving modes including an EV driving mode, a series driving mode, and a parallel driving mode. As shown in FIGS. 8 to 10, such hybrid vehicle includes a clutch 35 that engages/releases an engine shaft 32 at an engine 31 side with/from a motor shaft 34 at a motor 33 side, and the hybrid vehicle maintains the clutch 35 in an engaged state/a released state based on the driving mode (see, for example, Japanese Patent No. 3702897B). Any one of a wet type (single plate/multi-plates) and a dry type (single plate/multi-plates) may be used as the clutch. Hereinafter, both types will be referred to as the clutch.

Herein, referring to FIGS. 8 to 10, the relationships between each of the driving modes and the clutch will be described.

In the EV driving mode, a tire 36 of a vehicle 30 is driven by driving the motor 33, as shown in FIG. 8. In this case, the engine 31 stops, electric generation by a generator 37 also stops, and the clutch 35 is in the released state.

In the series driving mode, electricity is generated by the generator 37 by driving the engine 31, and the motor 33 is driven by using electricity generated by the generator 37 as well as electricity charged in a battery (not shown) so that the tire 36 of the vehicle 30 is driven, as shown in FIG. 9. Even in this case, the clutch 35 is in the released state.

Meanwhile, in the parallel driving mode, the tire 36 of the vehicle 30 is driven by driving the engine 31, and the clutch 35 is in the engaged state. As a result, the driving force of the engine 31 is transmitted to the motor shaft 34 side (drive shaft side), as shown in FIG. 10. In the parallel driving mode, the tire 36 of the vehicle 30 may be driven by driving both the engine 31 and the motor 33.

As described above, the vehicle 30 is driven while the clutch 35 is released and the engine shaft 32 and the motor shaft 34 are in a mechanical power-off state, in the EV driving mode and the series driving mode in which the motor 33 is used as a driving force. In contrast, in the parallel driving mode in which the engine 31 is used as a driving force, the vehicle 30 is driven while the clutch 35 is engaged and the engine shaft 32 and the motor shaft 34 are mechanically coupled to each other.

Accordingly, when the driving mode is switched from the EV driving mode or the series driving mode to the parallel driving mode, the clutch 35 having been released is engaged, whereas when the driving mode is switched from the parallel driving mode to the EV driving mode or the series driving mode, the clutch 35 having been engaged is released.

A maximum driving force of an engine 31 has a predetermined value depending on a vehicle velocity, whereas a maximum driving force which can be outputted by a motor 33 depends on not only the vehicle velocity but also a possible battery output which can be outputted by a battery (a detailed description will be made in FIGS. 2 to 4 to be described below). When the driving mode switches from the parallel driving mode to the series driving mode, a driving force shifts from the engine 31 to the motor 33 by releasing the clutch 35 having been engaged. However, just after the clutch 35 is released, if the possible battery output is not considered, there is a large difference between the maximum driving force of the engine 31 and the maximum driving force which can be outputted by the motor 33, and a torque shock occurs, such that the hybrid vehicle is not comfortable to drive.

SUMMARY

According to an aspect of the invention, there is provided a clutch control device of a hybrid vehicle, the clutch control device comprising: a battery which is charged with electricity generated by a generator; a motor which drives a motor shaft that is connected with a driving shaft of the hybrid vehicle by using at least one of the electricity generated by the generator and the electricity charged in the battery; an engine which drives the generator and the hybrid vehicle; a clutch; and a control unit which acquires a possible battery output that can be outputted by the battery and which sets a change vehicle velocity depending on the possible battery output, the control unit which changes a engaged state of the clutch in which the motor shaft and an engine shaft of the engine are engaged with each other to a released state of the clutch in which the motor shaft and the engine shaft are released from each other and changes an engine driving state of the hybrid vehicle in which the hybrid vehicle is driven by the engine to a motor driving state of the hybrid vehicle in which the hybrid vehicle is driven by the motor, when a vehicle velocity of the hybrid vehicle is the change vehicle velocity.

DETAILED DESCRIPTION OF EMBODIMENTS

Hereinafter, a clutch control device of a hybrid vehicle according to an exemplary embodiment of the present invention will be described with reference to FIGS. 1 to 7.

First Exemplary Embodiment

Figure 1:
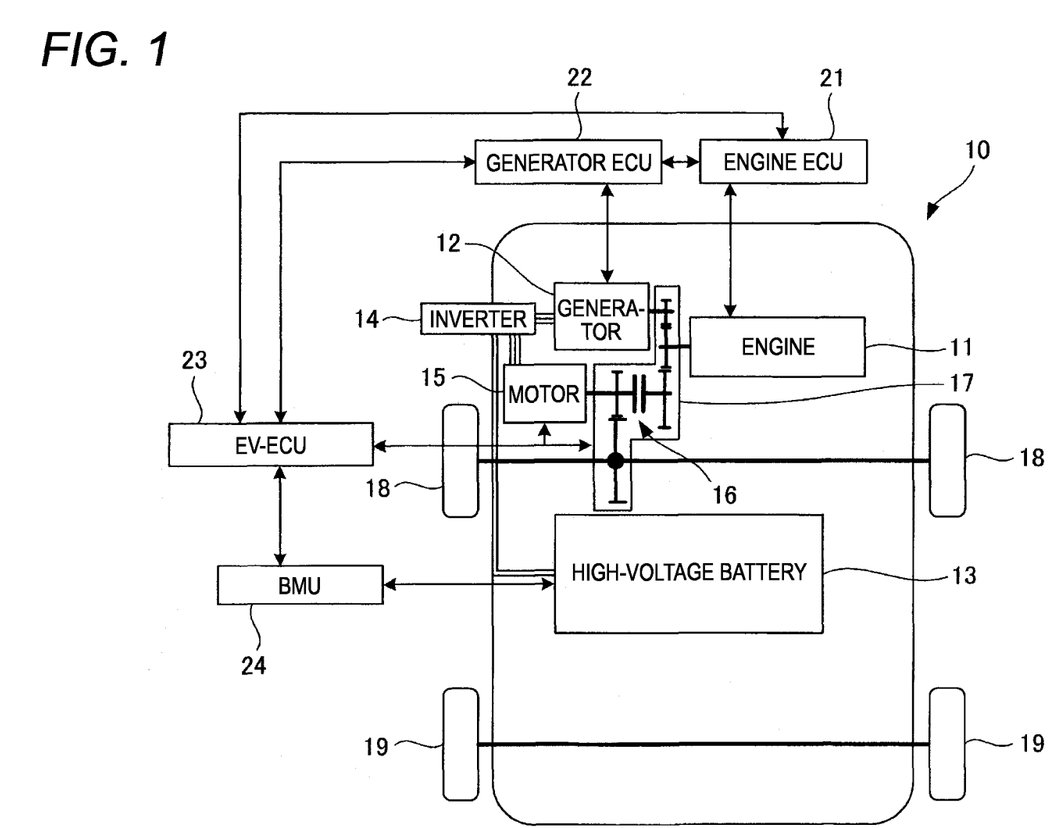
FIG. 1 is a configuration diagram of a vehicle including a clutch control device of a hybrid vehicle according to an exemplary embodiment of the present invention.
Figure 5:
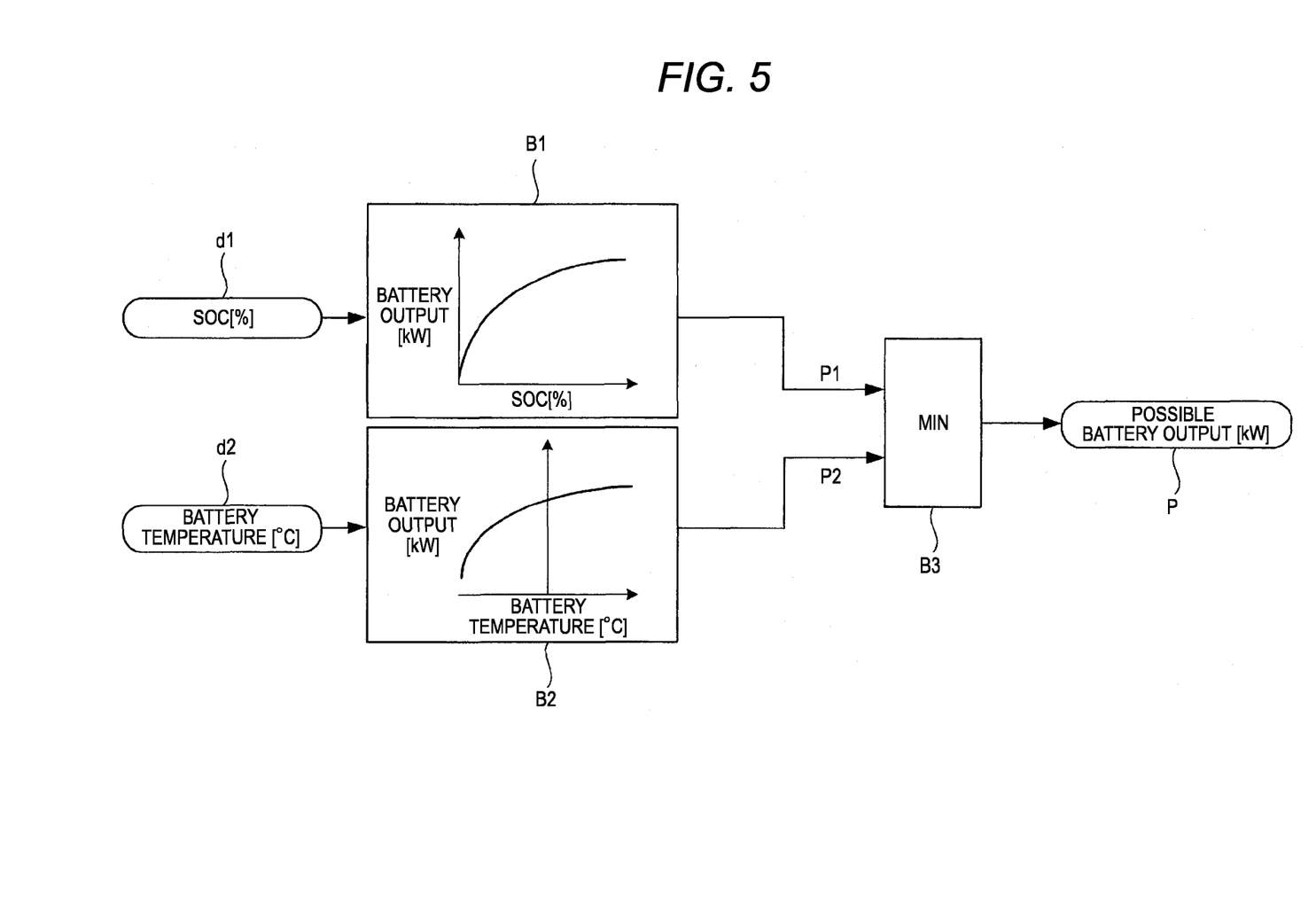
FIG. 5 is a block diagram when the possible battery output is calculated in the clutch control device of the hybrid vehicle according to the exemplary embodiment of the present invention.
Figure 6:
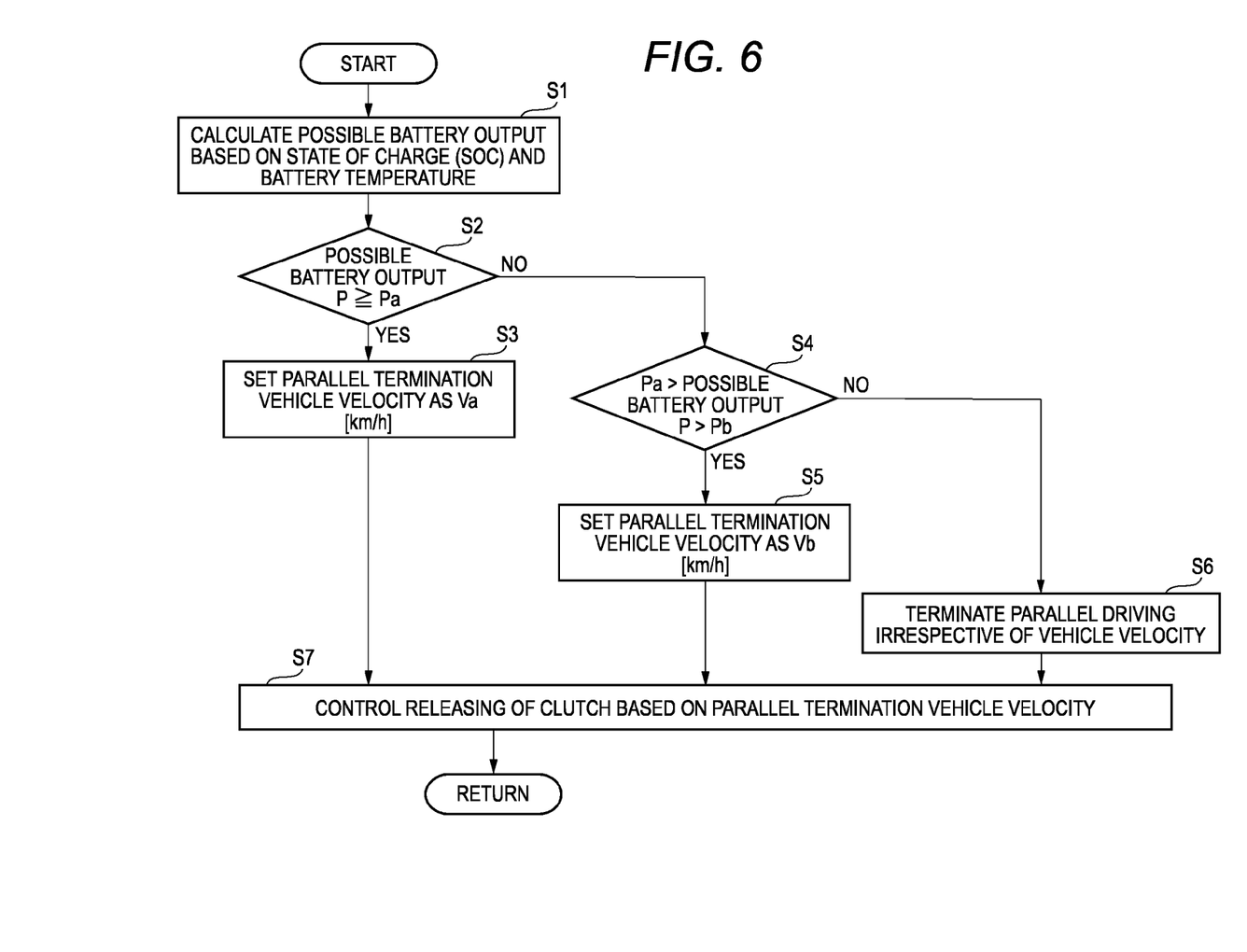
FIG. 6 is a flowchart illustrating control in the clutch control device of the hybrid vehicle according to the exemplary embodiment of the present invention.
Figure 7:
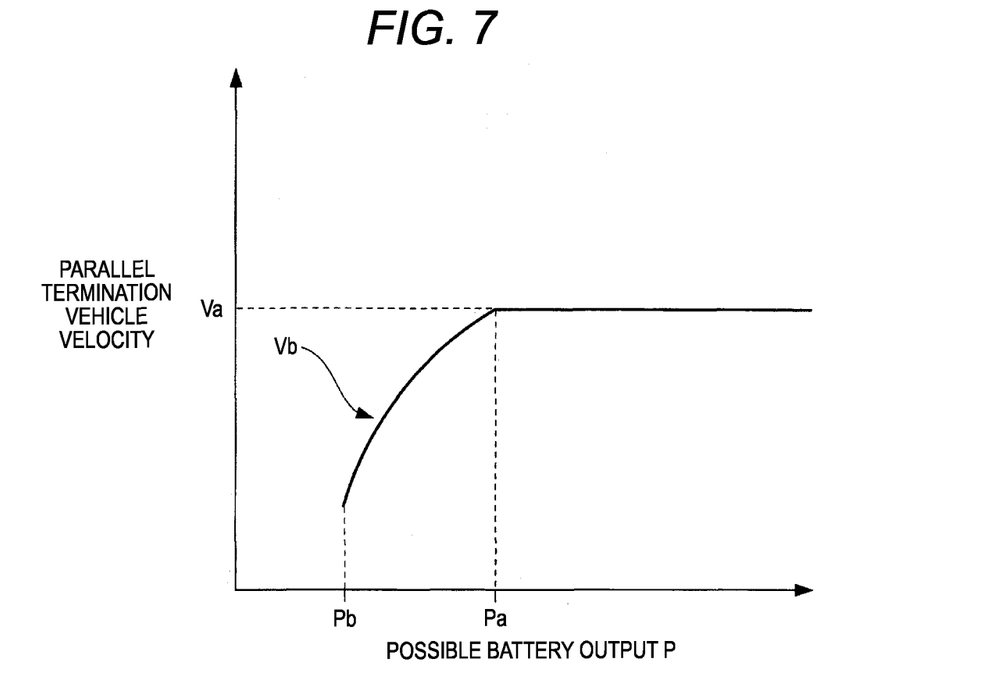
FIG. 7 is a graph illustrating the relationship between the possible battery output and a parallel termination vehicle velocity in the clutch control device of the hybrid vehicle according to the exemplary embodiment of the present invention.

FIG. 1 is a configuration diagram of a vehicle having a clutch control device of a hybrid vehicle according to an exemplary embodiment of the present invention. FIGS. 2A to 7 are diagrams explaining control in the clutch control device of the hybrid vehicle according to the exemplary embodiment of the present invention. Specifically, FIG. 2A is a control map when a possible battery output is equal to or more than a predetermined output, FIG. 3A is a control map when the possible battery output is less than the predetermined output, FIG. 4A is a control map when the possible battery output is equal to or less than an emergency determination output, FIG. 5 is a block diagram when the possible battery output is calculated, FIG. 6 is a flowchart illustrating controls thereof, and FIG. 7 is a graph illustrating the relationship between the possible battery output and a parallel termination vehicle velocity.

In the clutch control device of the hybrid vehicle according to the present exemplary embodiment, a vehicle 10 is a hybrid vehicle using an engine 11 and a motor 15 as a power source, as shown in FIG. 1. Specifically, the vehicle 10 includes the engine 11 serving as the power source for electric generation while driving the vehicle, a generator 12 driven by the engine 11 to generate electricity, a high-voltage battery 13 charging electricity generated by the generator 12, and a motor 15 receiving electricity from the generator 12 and the high-voltage battery 13 through an inverter 14 and using at least one of the electricity generated by the generator 12 and the electricity charged in the high-voltage battery 13, to drive the vehicle 10.

The motor 15 drives a drive shaft of a front wheel 18 and is connected with the drive shaft of the front wheel 18 through a gear box (transmission) 17 (specifically, through a differential in the gear box 17). Meanwhile, the engine 11 is also connected with the front wheel 18 through the gearbox 17, but connected with the front wheel 18 through a clutch 16 (further, through the differential in the gear box 17) installed in the gear box 17 when driving the drive shaft of the front wheel 18. The clutch 16 is controlled by a hydraulic control valve (not shown) such as a solenoid and specifically, engages/releases an engine shaft of the engine 11 and a motor shaft (a driving shaft) of the motor 15 to/from each other. Since the clutch 16 and the gear box 17 may have any configurations, a detailed description thereof will be omitted herein. The clutch 16 may be separated from the gear box 17 and further, any one of a wet type (single/multi-plates) and a dry type (single/multi-plates) may be used as the clutch 16.

In the exemplary embodiment, as an example, the motor 15 is installed at the front wheel 18 side, but a motor driving a rear wheel 19 may be further installed. In the exemplary embodiment, a hybrid vehicle in which the engine 11 is driven and electricity is generated by the generator 12 to charge the generated electricity in the high-voltage battery 13, is exemplified, but a plug-in hybrid vehicle in which the high-voltage battery 13 can be charged from a household power supply or a quick charger outside the vehicle may be used.

The vehicle 10 includes an engine electronics control unit (ECU) 21 controlling the engine 11, a generator ECU 22 controlling the generator 12, and an EV-ECU (vehicle integrated controller, a control unit) 23 controlling the high-voltage battery 13, the motor 15, and the gear box 17 (the clutch 16). The high-voltage battery 13 is connected with the EV-ECU 23 through a battery management unit (BMU) 24 managing the high-voltage battery 13. The BMU 24 monitors voltage, current, temperature, and state of charge (SOC) of the high-voltage battery 13 and calculates a possible battery output based on the temperature and the SOC, and notifies the possible battery output in addition to the voltage, the current, the temperature, and the SOC to the EV-ECU 23. The functions of the BMU 24 may be performed directly by the EV-ECU 23.

The engine ECU 21, the generator ECU 22, and the EV-ECU 23 can transmit and receive information to and from each other by using, for example, a controller area network (CAN). In the clutch control device according to the exemplary embodiment, the EV-ECU 23 controls the clutch 16, depending on the vehicle velocity and required driving force of the vehicle 10, to switch the EV driving in which the battery is used, the series driving in which the combination of the battery and the engine is used, and the parallel driving in which the engine is used, by performing the clutch control to be described below. The EV-ECU 23 detects the vehicle velocity of the vehicle 10 from a vehicle velocity sensor (not shown) and acquires the required driving force based on an opening degree of an accelerator detected from an accelerator pedal (not shown).

First, referring to FIGS. 2A and 2B, a control map when a possible battery output P is equal to or more than a predetermined output Pa will be described. A detailed description will be made below. When the possible battery output P is equal to or more than the predetermined output Pa, a possible motor driving force based on the possible battery output P and a maximum generation output Pg is equal to or more than a maximum motor driving force Tma.

A driving mode of the vehicle 10 is switched depending on the vehicle velocity and the required driving force. The driving mode includes the EV driving and the series driving (a motor driving state) in which the clutch 16 is released and the vehicle is driven by the motor 15, and the parallel driving (an engine driving state) in which the clutch 16 is engaged and the vehicle is driven by the engine 11, in view of the control of the clutch 16. A change vehicle velocity in which an engaged state of the clutch 16 is changed to a released state of the clutch 16 is set as a parallel termination vehicle velocity Va, and a detailed description for it will be made below.

In a caser where the possible battery output P is equal to or more than the predetermined output Pa, if the vehicle velocity is less than the parallel termination vehicle velocity Va, the clutch 16 is released and the vehicle is driven in the EV driving or the series driving. The driving force required for the EV driving and the series driving is a driving force by the motor 15. If the vehicle velocity and the driving force are a vehicle velocity and a driving force within a map region Rea of a possible battery driving force T by the possible battery output P which can be outputted from the high-voltage battery 13 at present, the EV driving is performed, and if the vehicle velocity and the driving force are a vehicle velocity and a driving force within a region Rsa of the maximum motor driving force Tma which is a maximum driving force which the motor 15 itself outputs, over the map region Rea, the series driving is performed.

Meanwhile, when the vehicle velocity is equal to or more than the parallel termination vehicle velocity Va, the clutch 16 is engaged and the vehicle is driven in the parallel driving. A driving force required for the parallel driving is a driving force by the engine 11. The parallel driving is performed with a vehicle velocity and a driving force within a map region Rpa of a maximum engine driving force Te which is a maximum driving force outputted from the engine 11.

Herein, the possible battery output P will be described with reference to FIG. 5. As shown in FIG. 5, a first calculation unit B1 acquires a first possible battery output P1 based on a SOC value d1 inputted into the BMU 24 from a map of a battery output and a SOC value. A second calculation unit B2 acquires a second possible battery output P2 based on a battery temperature value d2 inputted into the BMU 24 from a map of a battery output and a battery temperature value. A third calculation unit B3 selects the smaller one of the first possible battery output P1 and the second possible battery output P2, and sets the smaller one as the possible battery output P. The battery output for the SOC value is higher as the SOC value is higher, as seen from the map of the first calculation unit B1. The battery output for the battery temperature value is higher as the battery temperature value is higher, as seen from the map of the second calculation unit B2.

As described above, in the BMU 24, the possible battery output P is acquired by the SOC and the battery temperature of the high-voltage battery 13 and thereafter, is notified to the EV-ECU 23. In the motor 15 driven by the possible battery output P, the presently outputtable driving force becomes the possible battery driving force T.

Figures 2A, 2B:
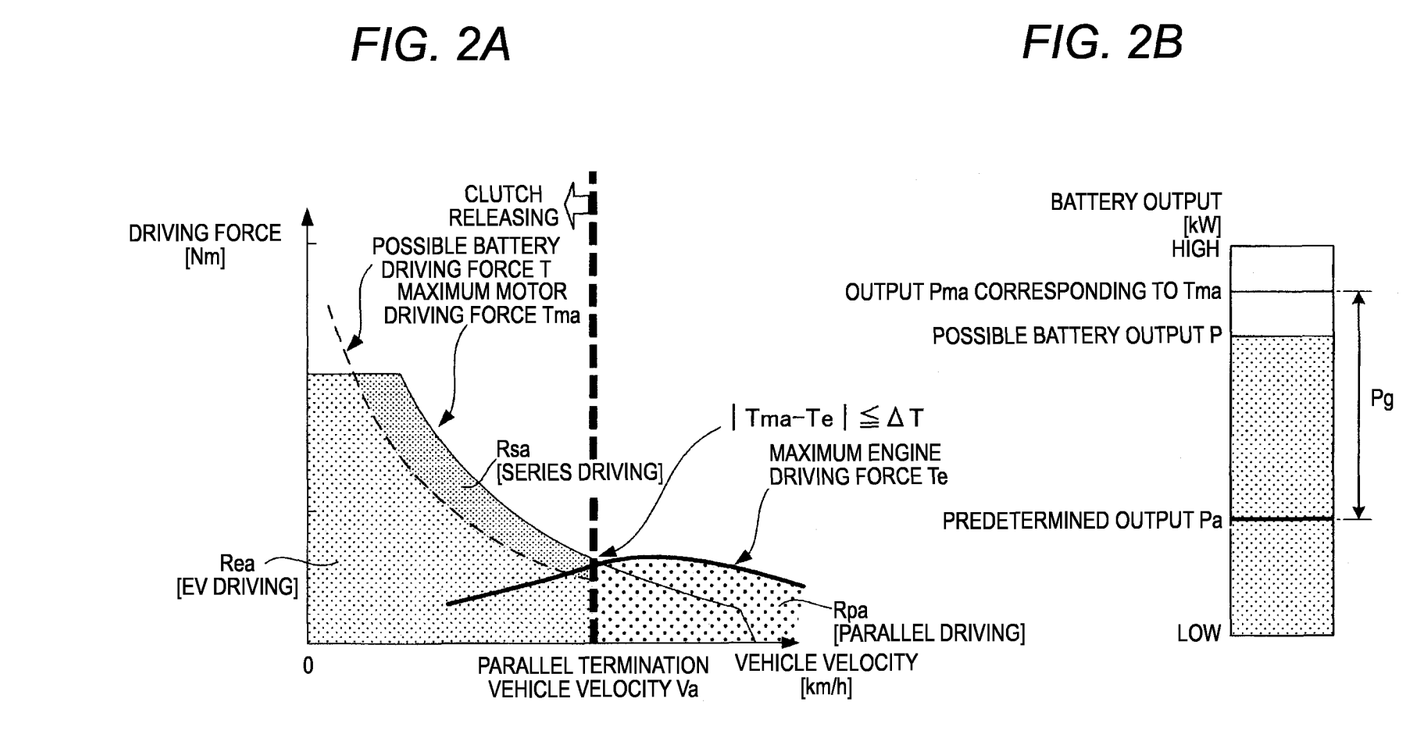
FIG. 2A and FIG. 2B are diagrams explaining control in the clutch control device of the hybrid vehicle according to the exemplary embodiment of the present invention and FIG. 2A is a control map when a possible battery output is equal to or more than a predetermined output.

In FIG. 2A, the maximum motor driving force Tma is the maximum driving force which the motor 15 itself outputs. When the vehicle velocity is low, the driving force can be outputted by using the possible battery output P, and when the vehicle velocity is medium, the driving force can be outputted by using the possible battery output P and an electric generation output from the generator 12. When a maximum output generated by the generator 12 is set to a maximum electric generation output Pg, a predetermined output Pa may be defined as the expression of Pa=Pma−Pg by the output Pma corresponding to the maximum motor driving force Tma and the maximum electric generation output Pg. Accordingly, as shown in a bar graph of FIG. 2B, when the possible battery output P is equal to or more than the predetermined output Pa, the EV driving and the series driving can be performed with the maximum motor driving force Tma by adding the electric generation output (generated power that is equal to or less than the maximum electric generation output Pg) from the generator 12.

The maximum motor driving force Tma is acquired to correspond to the vehicle velocity, the maximum engine driving force Te outputted by the engine 11 is acquired to correspond to the vehicle velocity, and the parallel termination vehicle velocity Va is set as to meet the expression of |Tma−Te|≤ΔT, where ΔT is a predetermined driving force difference for preventing torque shock from occurring. That is, referring to FIG. 2A, a vehicle velocity in the vicinity of an intersection point of an output curve of the maximum motor driving force Tma and an output curve of the maximum engine driving force Te is set as the parallel termination vehicle velocity Va.

In a case where the parallel driving is switched to the series driving or the EV driving, if the clutch 16 is released with a vehicle velocity other than the parallel termination vehicle velocity Va, variation in the driving force is large and the torque shock occurs, as is obvious from FIG. 2A.

Meanwhile, when the possible battery output P is equal to or more than the predetermined output Pa, that is, the motor possible driving force is equal to or more than the maximum motor driving force Tma, the parallel termination vehicle velocity Va is used, and when the parallel driving is switched to the series driving or the EV driving, if the vehicle velocity is the parallel termination vehicle velocity Va, the clutch 16 is released, and as a result, by releasing the clutch 16, the variation in the driving force is small and the torque shock decreases even though the driving force shifts from the engine 11 to the motor 15.

The relationship between the possible battery output and the parallel termination vehicle velocity in the cases of FIGS. 2A and 2B as well as FIGS. 3A to 4B to be described below is a graph shown in FIG. 7. Since the parallel termination vehicle velocity Va is determined by the maximum motor driving force Tma when the possible battery output P is equal to or more than the predetermined output Pa, the parallel termination vehicle velocity Va becomes a predetermined value, and for example, is set to any one in a range of 80 to 100 km/h.

Next, referring to FIGS. 3A and 3B, a control map when the possible battery output P is less than the predetermined output Pa (however, equal to or more than an emergency determination output Pb to be described below) will be described. When the possible battery output P is less than the predetermined output Pa, the possible motor driving force Tmb based on the possible battery output P and the maximum electric generation output Pg is less than the maximum motor driving force Tma.

The switching of the driving mode of the vehicle 10 is basically the same as that when the possible battery output P is equal to or more than the predetermined output Pa, however as described below, herein, a change vehicle velocity in which the engaged state of the clutch 16 is changed to the released state of the clutch 16 is set as a parallel termination vehicle velocity Vb.

When the possible battery output P is less than the predetermined output Pa, if the vehicle velocity is less than the parallel termination vehicle velocity Vb, the clutch 16 is released and the vehicle is driven in the EV driving or the series driving. The driving force required for the EV driving and the series driving is a driving force by the motor 15. and If the vehicle velocity and the driving force are a vehicle velocity and a driving force within a map region Reb of a possible battery driving force T by the possible battery output P which can be outputted from the high-voltage battery 13 at present, the EV driving is performed, and if the vehicle velocity and the driving force are a vehicle velocity and a driving force within a region Rsb of the motor possible driving force Tmb which the motor 15 can output at present, over the map region Reb, the series driving is performed.

Meanwhile, when the vehicle velocity is equal to or more than the parallel termination vehicle velocity Vb, the clutch 16 is engaged and the vehicle is driven in the parallel driving. A driving force required for the parallel driving is a driving force by the engine 11, and the parallel driving is performed with a vehicle velocity and a driving force within a map region Rpb of the maximum engine driving force Te from the engine 11.

As described above, the case where the possible battery output P is less than the predetermined output Pa seems to be the same as the case where the possible battery output P is equal to or more than the predetermined output Pa, however they are different from each other in some points according to the following reasons.

Figures 3A, 3B:
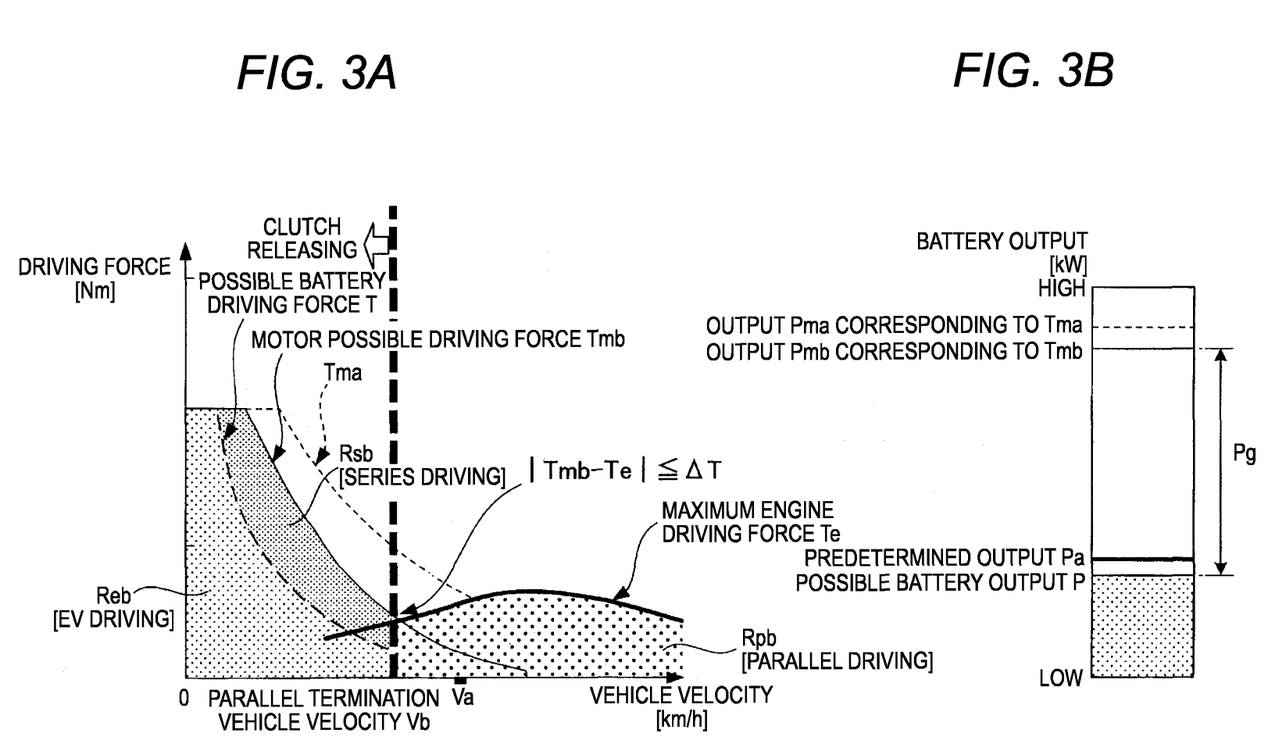
FIG. 3A and FIG. 3B are diagrams explaining control in the clutch control device of the hybrid vehicle according to the exemplary embodiment of the present invention and FIG. 3A is a control map when the possible battery output is less than the predetermined output.

As shown in FIG. 3B, when the possible battery output P is less than the predetermined output Pa, the output Pmb corresponding to the possible motor driving force Tmb does not reach the output Pma corresponding to the maximum motor driving force Tma even by adding the maximum electric generation output Pg.

For example, in FIG. 3A, as the possible motor driving force Tmb which the motor 15 can output at present, when the vehicle velocity is low, the maximum motor driving force Tma can be outputted by using the possible battery output P or the possible battery output P and the electric generation output from the generator 12, however when the vehicle velocity is medium, the maximum motor driving force Tma cannot be outputted even by using the possible battery output P and the maximum electric generation output Pg.

As a result, the region Rsb of the possible motor driving force Tmb shown in FIG. 3A is smaller than the region Rsa shown in FIG. 2A, and the region Rpb becomes larger by that amount. Since the possible battery output P decreases, even the region Reb of the possible battery driving force T shown in FIG. 3A is naturally smaller than the region Rea shown in FIG. 2A.

Herein, the possible motor driving force Tmb is acquired to correspond to the vehicle velocity based on the possible battery output P and the maximum electric generation output Pg, and the parallel termination vehicle velocity Vb is set as to meet the expression of $|Tmb-Te| \leq \Delta T$ by using the maximum engine driving force Te acquired to correspond to the vehicle velocity and the predetermined driving force difference $\Delta T$ for preventing torque shock from occurring. That is, referring to FIG. 3A, a vehicle velocity in the vicinity of an intersection point of an output curve of the motor possible motor driving force Tmb and an output curve of the maximum engine driving force Te is set as the parallel termination vehicle velocity Vb. In a vehicle velocity range in which the clutch 16 is engaged/released, Tma>Tmb is satisfied, and as a result, the parallel termination vehicle velocity Vb is smaller than the parallel termination vehicle velocity Va and the parallel termination vehicle velocity Vb shifts from the parallel termination vehicle velocity Va to a low vehicle velocity side.

As described above, when the possible battery output P is less than the predetermined output Pa, a vehicle velocity in which the difference between the possible motor driving force Tmb and the maximum engine driving force Te is equal to or less than the predetermined driving force difference $\Delta T$, is set as the parallel termination vehicle velocity Vb. Meanwhile, when the possible battery output P described above is equal to or more than the predetermined output Pa, a vehicle velocity in which the maximum motor driving force Tma is used instead of the motor possible driving force, and the difference between the maximum motor driving force Tma and the maximum engine driving force Te is equal to or less than the predetermined driving force difference $\Delta T$, is set as the parallel termination vehicle velocity Va.

When the parallel driving is switched to the series driving or the EV driving, if the clutch 16 is released with a vehicle velocity other than the parallel termination vehicle velocity Vb, for example, when the clutch 16 is released with the vehicle velocity Va, the driving force difference between the motor possible driving force Tmb and the maximum engine driving force Te is large as is obvious from FIG. 3A, and as a result, the torque shock occurs.

Meanwhile, when the possible battery output P is less than the predetermined output Pa, that is, the possible motor driving force Tmb is less than the maximum motor driving force Tma, the parallel termination vehicle velocity Vb is used, and when the parallel driving is switched to the series driving or the EV driving, if the vehicle velocity is the parallel termination vehicle velocity Vb, the clutch 16 is released, and as a result, by releasing the clutch 16, the variation in the driving force is small and the torque shock decreases even though the driving force shifts from the engine 11 to the motor 15.

Herein, since the possible motor driving force Tmb varies depending on the possible battery output P, the parallel termination velocity Vb varies depending on the possible battery output P, and is set to, for example, a range of 50 to 80 km/h, as shown in FIG. 7.

Next, referring to FIGS. 4A and 4B, a control map will be described when the possible battery output P is equal to or less than an emergency determination output Pb. The emergency determination output Pb is a battery output of determining the prior step of running out of the battery (cell discharge).

When the possible battery output P is equal to or less than the emergency determination output Pb, the driving mode of the vehicle 10 is switched depending on the vehicle velocity and the required driving force, however in a full range of the vehicle velocity, the clutch 16 is prevented from being engaged and when the clutch 16 is in the engaged state, the clutch 16 is released. That is, the parallel driving is not used, and is switched to the EV driving or the series driving depending on the vehicle velocity and the required driving force.

As described above, when the possible battery output P is equal to or less than the emergency determination output Pb, the clutch 16 is released irrespective of the vehicle velocity and the vehicle is driven in the EV driving or series driving. The driving force required for the EV driving and the series driving is a driving force by the motor 15. If the vehicle velocity and the driving force are a vehicle velocity and a driving force within a map region Rec of the possible battery driving force T by the possible battery output P which can be outputted from the high-voltage battery 13 at present, the EV driving is performed, and if the vehicle velocity and the driving force are a vehicle velocity and a driving force within a region Rsc of the motor possible driving force Tmc which the motor 15 can output at present, over the map region Rec, the series driving is performed.

Figures 4A, 4B:
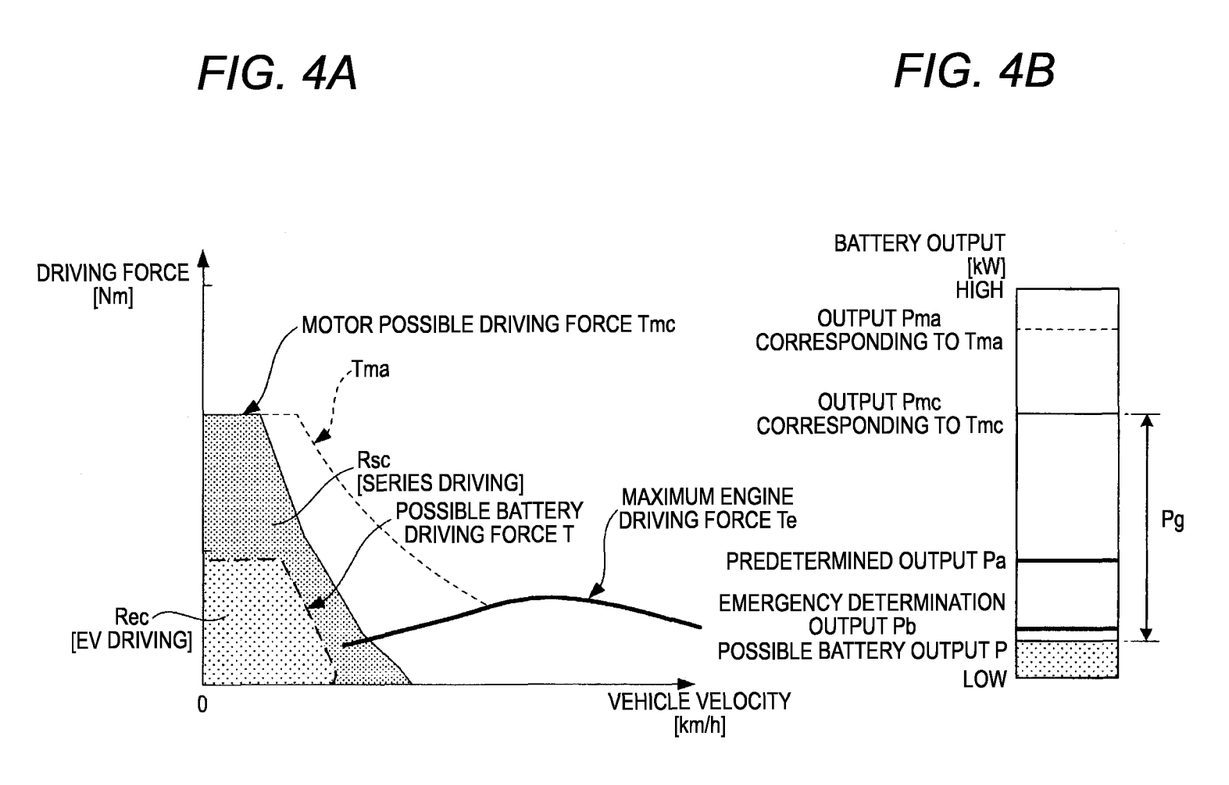
FIG. 4A and FIG. 4B are diagrams explaining control in the clutch control device of the hybrid vehicle according to the exemplary embodiment of the present invention and FIG. 4A is a control map when the possible battery output is equal to or less than an emergency determination output.

As shown in FIG. 4B, when the possible battery output P is equal to or less than the emergency determination output Pb, the output Pmc corresponding to the motor possible driving force Tmc does not reach the output Pma corresponding to the maximum motor driving force Tma even by adding the maximum electric generation output Pg.

For example, in FIG. 4A, as the possible motor driving force Tmc which the motor 15 can output at present, when the vehicle velocity is low, the maximum motor driving force Tma can be outputted by using the possible battery output P and the electric generation output from the generator 12, however when the vehicle velocity is medium, the maximum motor driving force Tma cannot be outputted even by using the possible battery output P and the maximum electric generation output Pg.

As a result, the region Rsc of the motor possible driving force Tmc shown in FIG. 4A is smaller than the region Rsa shown in FIG. 2A and the region Rsb shown in FIG. 3A. Since the possible battery output P decreases, even the region Rec of the possible battery driving force T shown in FIG. 4A is naturally smaller than the region Rea shown in FIG. 2A and the region Reb shown in FIG. 3A. When the EV driving continues for a long time, a battery output minimally required for the motor 15 may not be secured, and as a result, the region Rec, that is, the ranges of the vehicle velocity and the driving force are significantly limited.

Therefore, when the possible battery output P is equal to or less than the emergency determination output Pb, the clutch 16 is prevented from being engaged in the full range of the vehicle velocity and further, when the clutch 16 is engaged, the clutch 16 is immediately released and the parallel driving is prevented from being used, thereby preventing the high-voltage battery 13 from running out. As a result, herein, like the parallel termination vehicle velocity Va shown in FIG. 2A and the parallel termination vehicle velocity Vb shown in FIG. 3A, it is not necessary to set the parallel termination vehicle velocity.

Last, with reference to the flowchart shown in FIG. 6, a series of sequences associated with the control described above will be described.

(Step S1)

A possible battery output P is calculated based on an SOC and a battery temperature. Specifically, as described in FIG. 5, the smaller one between the first possible battery output P1 for the SOC value d1 and the second possible battery output P2 for the battery temperature value d2 is set as the possible battery output P.

(Step S2)

While the possible battery output P is monitored by the EV-ECU 23, the calculated possible battery output P is compared with the predetermined output Pa and if P≥Pa is satisfied, the process proceeds to step S3 and if P≥Pa is not satisfied, the process proceeds to step S4.

(Step S3)

If P≥Pa is satisfied, a parallel termination vehicle velocity is set as the parallel termination vehicle velocity Va and the process proceeds to step S7. As the parallel termination vehicle velocity Va, a vehicle velocity which meets the expression of |Tma−Te|≤ΔT is set, as described above.

(Step S4)

If P≥Pa is not satisfied, the calculated possible battery output P is compared with the predetermined output Pa and the emergency determination output Pb (Pa>Pb), and if Pa>P>Pb is satisfied, the process proceeds to step S5 and if Pa>P>Pb is not satisfied, the process proceeds to step S6.

(Step S5)

If Pa>P>Pb is satisfied, the parallel termination vehicle velocity is set as the parallel termination vehicle velocity Vb and the process proceeds to the step S7. As the parallel termination velocity Vb, a vehicle velocity which meets the expression of |Tmb−Te|≤ΔT is set, as described above.

(Step S6)

If Pa>P>Pb is not satisfied, Pb≥P is satisfied and in this case, the setting for terminating the parallel driving is set irrespective of the vehicle velocity and the process proceeds to the step S7.

(Step S7)

If P≥Pa is satisfied, the clutch releasing control is performed based on the parallel termination vehicle velocity Va. Specifically, when the parallel driving is switched to the series driving or the EV driving, if the vehicle velocity becomes the parallel termination vehicle velocity Va, the control of changing the engaged state of the clutch 16 to the released state of the clutch 16 is performed. If Pa>P≥Pb is satisfied, the clutch releasing control is performed based on the parallel termination vehicle velocity Vb. Specifically, when the parallel driving is switched to the series driving or the EV driving, if the vehicle velocity becomes the parallel termination vehicle velocity Vb, the control of changing the engaged state of clutch 16 to the released state of the clutch 16 is performed. Meanwhile, if Pb≥P is satisfied, the parallel driving is terminated irrespective of the vehicle velocity. If the clutch 16 is engaged, the clutch 16 is immediately released. If the clutch 16 is released, the clutch 16 is prevented from being engaged.

As described above, since a parallel termination vehicle velocity for releasing the clutch 16 is set according to the possible battery output P which can be outputted from the high-voltage battery 13, variation in a driving force is small and torque shock decreases even by releasing the clutch 16 when the parallel driving is switched to the series driving or the EV driving.

According to an aspect of the present invention, since a change vehicle velocity in which an engine driving state is switched to a motor driving state is set depending on a possible battery output, torque shock can be prevented when switching a mode from the engine driving state to the motor driving state.

The present invention is suitable for a hybrid vehicle.

What is claimed is:

1. A clutch control device of a hybrid vehicle, the clutch control device comprising:
   a battery which is charged with electricity generated by a generator;
   a motor which drives a motor shaft that is connected with a driving shaft of the hybrid vehicle by using at least one of the electricity generated by the generator and the electricity charged in the battery;
   an engine which drives the generator and the hybrid vehicle;
   a clutch; and
   a control unit which acquires a possible battery output that can be outputted by the battery and which sets a change vehicle velocity depending on the possible battery output, the control unit which changes a engaged state of the clutch in which the motor shaft and an engine shaft of the engine are engaged with each other to a released state of the clutch in which the motor shaft and the engine shaft are released from each other and changes an engine driving state of the hybrid vehicle in which the hybrid vehicle is driven by the engine to a motor driving state of the hybrid vehicle in which the hybrid vehicle is driven by the motor, when a vehicle velocity of the hybrid vehicle is the change vehicle velocity.

2. The clutch control device according to claim 1, wherein the control unit acquires a possible motor driving force that can be outputted by the motor and that corresponds to the vehicle velocity based on a maximum electric generation output that is outputted by the generator and the possible battery output,
   the control unit acquires a maximum engine driving force that is outputted by the engine and that corresponds to the vehicle velocity, and
   the control unit sets a velocity in which a difference between the possible motor driving force and the maximum engine driving force is equal to or less than a predetermined difference, as the change vehicle velocity.

3. The clutch control device according to claim 2, wherein the control unit acquires a maximum motor driving force that is outputted by the motor and that corresponds to the vehicle velocity, and
   the control unit sets a velocity in which a difference between the maximum motor driving force and the maximum engine driving force is equal to or less than a predetermined difference, as the change vehicle velocity, when the possible motor driving force is equal to or greater than the maximum motor driving force.

4. The clutch control device according to claim 1, wherein in a case where the possible battery output is equal to or less than an emergency determination output for determining a prior step of running out of the battery, the control unit prevents the clutch from being engaged, irrespective of the vehicle velocity, and releases the clutch when the clutch is in the engaged state.

5. The clutch control device according to claim 1, wherein the control unit acquires the possible battery output from a temperature and a state of charge of the battery.

\* \* \* \* \*